(12) United States Patent
Kinoshita

(10) Patent No.: US 7,683,762 B2
(45) Date of Patent: Mar. 23, 2010

(54) METHOD AND SYSTEM FOR ACQUIRING MAINTENANCE INFORMATION BY AN RFID TAG

(75) Inventor: Yutaka Kinoshita, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 342 days.

(21) Appl. No.: 11/041,967

(22) Filed: Jan. 26, 2005

(65) Prior Publication Data

US 2005/0162256 A1 Jul. 28, 2005

(30) Foreign Application Priority Data

Jan. 27, 2004 (JP) ............... 2004-018828

(51) Int. Cl.
*H04Q 5/22* (2006.01)
(52) U.S. Cl. ............... 340/10.4; 340/10.5; 340/825.72; 340/5.64; 340/572.4; 340/572.7; 340/572.8
(58) Field of Classification Search ............... 340/5.54, 340/5.1, 5.2, 5.51, 10.4, 10.1, 10.5, 825.72, 340/5.64, 572.7, 572.8, 572.4
See application file for complete search history.

(56) References Cited

U.S. PATENT DOCUMENTS

| | | | | |
|---|---|---|---|---|
| 5,483,827 A | * | 1/1996 | Kulka et al. ............... | 73/146.5 |
| 5,565,858 A | * | 10/1996 | Guthrie ............... | 340/10.33 |
| 5,995,898 A | * | 11/1999 | Tuttle ............... | 701/102 |
| 6,176,425 B1 | * | 1/2001 | Harrison et al. ............... | 235/385 |
| 6,822,582 B2 | * | 11/2004 | Voeller et al. ............... | 340/933 |
| 2005/0087235 A1 | * | 4/2005 | Skorpik et al. ............... | 137/554 |

FOREIGN PATENT DOCUMENTS

| | | |
|---|---|---|
| JP | 1-310451 A | 12/1989 |
| JP | 2-220597 A | 9/1990 |
| JP | 2000-285170 A | 10/2000 |
| JP | 2001-147144 A | 5/2001 |
| JP | 2002-037414 A | 2/2002 |
| JP | 2002-092569 A | 3/2002 |
| JP | 2002-124891 A | 4/2002 |
| JP | 2004-005317 A | 1/2004 |

* cited by examiner

*Primary Examiner*—Vernal U Brown
(74) *Attorney, Agent, or Firm*—Foley & Lardner LLP

(57) ABSTRACT

A control apparatus 10 has a housing containing an IC memory 25 of an RFID tag 20 as a memory element. The RFID tag 20 has an antenna 21 so as to close the housing. The antenna 21 may be attached to an outside of the housing so as to transmit and receive a radio wave to and from the outside of the housing and is connected to the inside of the housing in a closed state via a lead wire insulated from the housing. The housing may be made of a metal with a removable metallic cover formed at a part thereof to allow transmission and reception of the radio wave. The control apparatus 10 may have an RFID tag counterpart section 14 with an antenna 16 so that the RFID tag 20 is electrically insulated from a control circuit of the control apparatus 10.

3 Claims, 9 Drawing Sheets

METHOD AND SYSTEM FOR ACQUIRING MAINTENANCE INFORMATION BY AN RFID TAG

This application claims priority to prior Japanese patent application JP 2004-18828, the disclosure of which is incorporated herein by reference.

BACKGROUND OF THE INVENTION

This invention relates to a method and a system for acquiring maintenance information, which are capable of easily monitoring and confirming an internal state of a control apparatus as a maintenance object, such as a computer and an apparatus or a system including a computer unit. According to the method and the system, an executing state of a program in the control apparatus being operated is acquired in correspondence to necessary maintenance information and stored in memory means. The maintenance information stored in the memory means is read and confirmed if necessary. In particular, this invention relates to a method and a system for acquiring maintenance information, which enable a maintainer to easily judge an internal condition of an apparatus as a maintenance object irrespective of various factors such as structural limitation of the apparatus, a state of trouble, and an environment of installation.

An existing method and an existing system for acquiring maintenance information have already been put into practical use as an IC (Integrated Circuit) card in a monitoring system for a microcomputer control equipment (see Japanese Unexamined Patent Application Publication (JP-A) No. H1-310451) or a card memory in a monitoring/diagnosing apparatus for an electric control system (see Japanese Unexamined Patent Application Publication (JP-A) No. H2-220597).

Referring to FIG. 1, an existing system will be described. A control apparatus 110 such as a computer comprises a function execution processing section 111 for processing execution of a predetermined function by the use of a program. During processing of execution of the predetermined function, historical data or log data are successively recorded in a historical data memory 112 and a processing state is monitored. Upon occurrence of trouble in the control apparatus 110, an alarm indicator section 113 produces a visible and audible alarm to notify the occurrence of trouble to a user or a maintainer.

In this case, it is possible to examine the trouble if the control apparatus 110 can be operated and the log data recorded in the historical data memory 112 can be read. Sometimes, however, the log data can not be read due to power-off or a failure in the function execution processing section 111.

In order to avoid the above-mentioned problem, the system illustrated in FIG. 1 uses an IC card 100 containing an IC memory. Specifically, the control apparatus 110 further comprises a read/write section (hereinafter abbreviated to a R/W section) 114 for writing the log data recorded in the historical data memory 112 into the IC card 100 and for reading memory information from the IC card 100 and writing the memory information into the historical data memory 112, and an IC card mounting section 115 for receiving the IC card 100 inserted into the apparatus 110 and electrically connecting the IC card 100 to the R/W section 114. For example, every time when the historical data memory 112 records data, the R/W section 114 writes the same data into the IC card 100 mounted to the IC card mounting section 115.

The above-mentioned method and the above-mentioned system for acquiring maintenance information by the use of the IC card are practically effective. However, the IC card must be mounted in order to obtain information. By overwriting the historical data such as program execution data after the data are accumulated in a predetermined period or in a predetermined amount, the storage capacity of the IC card can be saved. However, in order to monitor the operating condition, the IC card must be taken out from the control apparatus. Therefore, if the IC card is lost or if another IC card is not inserted by mistake after the IC card is taken out, the maintenance information may possibly be lost in the above-mentioned method or system.

The above-mentioned disadvantage is a serious bottleneck in acquisition of the maintenance information continuously monitored in order to grasp the operating condition upon occurrence of trouble in the control apparatus.

In order to avoid the above-mentioned problem, proposal is made of methods using an RFID (Radio Frequency Identification) tag instead of the IC card (See Japanese Unexamined Patent Application Publications (JP-A) Nos. 2002-124891 and 2002-37414.

The RFID tag has an RF-ID (Radio Frequency Identification) function allowing non-contact identification of an object via a radio wave from an outside of the object when the RFID tag is attached to the object.

Referring to FIG. 2, an RFID tag 20 is attached to an item 210 as a maintenance object and includes an antenna 21 and an IC chip 22 inside the RFID tag 20. The IC chip 22 comprises a transmitter/receiver section 23 connected to the antenna 21, a control section 24, and a memory 25. Outside the RFID tag 20, a reader/writer 30 is provided to write data into the memory 25 or read data written in the memory 25.

With the above-mentioned structure, the antenna 21 receives a radio wave from the reader/writer 30 approaching the antenna 21 and produces induced power to drive the IC chip 22. In response to a read request from the reader/writer 30, the transmitter/receiver section 23 transmits the data stored in the memory 25 under control of the control section 24. In response to a write request from the reader/writer 30, the transmitter/receiver section 23 writes received data into the memory 25 under control of the control section 24.

Japanese Unexamined Patent Application Publication (JP-A) No. 2002-124891 discloses an information acquisition assisting method using an RFID tag. The RFID tag is mounted to a component as an object of information acquisition. Reading/writing operations for the memory of the RFID tag are carried out by a mobile terminal. In this method, necessary information containing professional knowledge related to the object with the RFID tag attached thereto can easily be acquired at a place where the object is present.

Japanese Unexamined Patent Application Publication (JP-A) No. 2002-37414 discloses a technique in which product information specific to a product and purchaser information specific to a purchaser of the product are written in an IC chip contained in a tag. This technique is intended to prevent loss of memory information resulting from the use of the IC card and to read information in the tag while the tag is kept attached to the product.

In either of the Japanese Unexamined Patent Application Publications (JP-A) Nos. 2002-124891 and 2002-37414, writing into the RFID tag is carried out by an external writer and reading from the RFID tag is carried out by an external reader. Read data are sent to a computer separately provided and a lot of information corresponding to specific information read from the RFID tag can be received from the computer.

Recently, it is mandatory to apply a VCCI (Voluntary Control Council for Interference by Information Technology Equipment) standard to a wide range of control apparatuses in electric products.

As described above, if the memory storing maintenance information for a maintenance object is the card-type IC memory, the memory may possibly be lost or may be damaged due to penetration of dust or wastewater through a card slot. On the other hand, the RFID tag is capable of removing the above-mentioned disadvantage in the IC card. However, the RFID tag only has a function of transmitting and receiving object-specific or inherent information to and from the outside of the maintenance object and does not have a function of retrieving information in the object. Further, as another condition, application of the VCCI standard is regarded important.

SUMMARY OF THE INVENTION

It is therefore an object of this invention to provide a method and a system for acquiring maintenance information of a maintenance object at the outside of a housing of the maintenance object, which are capable of preventing loss of a memory storing the maintenance information of the maintenance object and penetration of a fluid into the housing of the maintenance object.

It is another object of this invention to provide the above-mentioned method and the above-mentioned system which are effective in case where the maintenance object is provided with radio interference protection.

Methods according to this invention and systems according to this invention are as follows.

(1) A method of acquiring maintenance information, in which maintenance information of an apparatus as a maintenance object is stored in the apparatus and the maintenance information is acquired from the outside of the apparatus at a predetermined time instant, the method comprising the steps of accommodating in the apparatus an RFID (Radio Frequency Identification) tag having a first antenna and adapted to store the maintenance information, and reading and acquiring the maintenance information stored in the RFID tag at the predetermined time instant by a reader outside the apparatus via the first antenna of the RFID tag by using a radio wave.

(2) The method as described in (1), further comprising the step of accommodating a second antenna in the apparatus, transmitting the maintenance information to the first antenna via the second antenna by using the radio wave, and storing the maintenance information received from the first antenna into the RFID tag.

(3) The method as described in (2), further comprising the step of intercepting and acquiring, by the reader outside the apparatus, the maintenance information sent via the second antenna to the first antenna by using the radio wave.

(4) A system for acquiring maintenance information, in which maintenance information of an apparatus as a maintenance object is stored in the apparatus and the maintenance information stored in the apparatus is acquired by a reader outside the apparatus at a predetermined time instant, wherein:

the apparatus comprises an RFID tag including a first antenna and an IC memory and allowing data to be written in and read from the IC memory through the first antenna, a second antenna, a historical data memory for storing the maintenance information, and an RFID tag counterpart transmitter/receiver section for reading from the historical data memory the maintenance information stored in the historical data memory at the predetermined time instant and transmitting the maintenance information through the second antenna to the first antenna by using a radio wave;

the RFID tag including a transmission/reception control section which is responsive to a write request through the first antenna from the second antenna, then produces induced power by a received radio wave carrying the write request to drive the RFID tag, and stores in the IC memory the maintenance information supplied next and which is responsive to a read request from the reader, then produces induced power by a received radio wave carrying the read request to drive the RFID tag, reads the maintenance information stored in the IC memory, and transmits the maintenance information through the first antenna to the reader by using the radio wave;

the reader including a third antenna and a transmission/reception control section for sending the read request via the third antenna by using the radio wave to acquire the maintenance information from the first antenna.

(5) The system as described in (4), wherein, in case where a housing of the apparatus has a radio wave shielding structure, the housing of the radio wave shielding structure has a removable radio wave shielding cover allowing transmission/reception of the radio wave at least at a portion corresponding to the first antenna.

(6) The system as described in (4), wherein, in case where a housing of the apparatus has a radio wave shielding structure, the first antenna of the RFID tag is disposed on an outer surface of the housing of the radio wave shielding structure, the RFID tag further having a fourth antenna disposed inside the housing of the radio wave shielding structure for transmitting and receiving data to and from the second antenna.

(7) The system as described in (4), wherein, in case where a housing of the apparatus has a radio wave shielding structure, the second antenna of the apparatus and the RFID tag are disposed on an outer surface of the housing.

(8) The system as described in (4), wherein the reader has a transmission/reception control section for intercepting, by the use of the third antenna, the radio wave sent from the second antenna to the first antenna to acquire the maintenance information.

(9) A system for acquiring maintenance information, in which maintenance information of an apparatus as a maintenance object is stored in the apparatus and the maintenance information stored in the apparatus is acquired by a reader outside the apparatus at a predetermined time instant, wherein:

the apparatus comprises an RFID tag including a first antenna and an IC memory and allowing data to be written in and read from the IC memory through the first antenna, a historical data memory for memorizing the maintenance information, and a writing section for reading from the historical data memory the maintenance information stored in the historical data memory at the predetermined time instant and writing the maintenance information into the IC memory of the RFID tag;

the RFID tag including a transmission/reception control section which is responsive to a read request from the reader through the first antenna, then produces induced power by a received radio wave carrying the read request to drive the RFID tag, reads the maintenance information stored in the IC memory, and transmits the maintenance information through the first antenna to the reader by using the radio wave;

the reader including a third antenna and a transmission/reception control section for sending the read request via the third antenna by using the radio wave to acquire the maintenance information from the first antenna.

(10) The system as described in (9), wherein the first antenna is disposed on an outer surface of a housing of the apparatus.

As described above, the method and the system for acquiring maintenance information according to this invention include the RFID (Radio Frequency Identification) tag having the first antenna and adapted to store the maintenance information. The maintenance information stored in the RFID tag is read and acquired at a predetermined time instant by the reader outside the apparatus via the first antenna of the RFID tag by using the radio wave. The RFID tag is contained in a closed housing of the apparatus. It is therefore possible to prevent loss of a memory medium storing the maintenance information of the apparatus as an object and penetration of a fluid into the apparatus. In addition, in case where the maintenance information is a history of execution processing of a functional operation, the state of the apparatus can be read from the memory upon occurrence of trouble without disassembling the apparatus. Further, the memory of the RFID tag is small in size and light in weight.

In the method and the system described above, the apparatus may have the second antenna and transmit the maintenance information to the first antenna via the second antenna by using the radio wave. The maintenance information received from the first antenna is written and stored in the RFID tag. The RFID tag and a function execution processing circuit of the apparatus are not connected by a lead wire but are electrically insulated from each other. Therefore, even if the apparatus operated by a commercial power supply encounters lightning, it is possible to avoid the memory of the RFID tag from being damaged.

The housing may have the removable radio wave shielding cover allowing transmission/reception of the radio wave at least at the portion corresponding to the first antenna. Therefore, even if the housing of the apparatus is made of metal and suppresses radio interference to the outside, the maintenance information stored in the RFID tag can be read by removing the cover. The first antenna and the fourth antenna of the RFID tag for transmitting and receiving data to and from the second antenna may be disposed on the outer surface of the housing and inside the housing, respectively. In this case, even if the housing of the apparatus is made of metal and interrupts the radio wave to the outside, the maintenance information stored in the RFID tag can be read.

DESCRIPTION OF THE PREFERRED EMBODIMENTS

In a method and a system for acquiring maintenance information of a maintenance object at the outside of a housing of the maintenance object, it is desired to prevent loss of a memory storing the maintenance information of the maintenance object and penetration of a fluid into the housing of the maintenance object. To this end, an apparatus as the maintenance object comprises an RFID tag including a first antenna and an IC memory and allowing data to be written in and read from the IC memory through the first antenna, a second antenna, a historical data memory for storing the maintenance information, and an RFID tag counterpart transmitter/receiver section for reading from the historical data memory the maintenance information stored in the historical data memory at the predetermined time instant and transmitting the maintenance information through the second antenna to the first antenna by using a radio wave. With this structure, even if the control apparatus as an electric product encounters lightning, the memory storing the maintenance information is not damaged.

The RFID tag includes a transmission/reception control section which is responsive to a write request through the first antenna from the second antenna, then produces induced power by a received radio wave carrying the write request to drive the RFID tag, and writes and stores in the IC memory the maintenance information supplied next and which is responsive to a read request from the reader, then produces induced power by a received radio wave carrying the read request to drive the RFID tag, reads the maintenance information stored in the IC memory, and transmits the maintenance information through the first antenna to the reader by using the radio wave.

The reader includes a third antenna and a transmission/reception control section for sending the read request via the third antenna by using the radio wave to acquire the maintenance information from the first antenna.

Further, an object to provide the maintenance object with radio interference protection is realized by forming the housing having a radio wave shielding structure, providing the housing with a removable radio wave shielding cover allowing transmission/reception of the radio wave at a portion corresponding to the first antenna. Alternatively, the above-mentioned object is realized when the first antenna of the RFID tag is arranged on an outer surface of the housing of the radio wave shielding structure and the fourth antenna for transmitting/receiving data to and from the second antenna is arranged inside the housing of the radio wave shielding structure. Thus, the above-mentioned object is achieved without damaging the above-mentioned function.

First Embodiment

Figure 1:
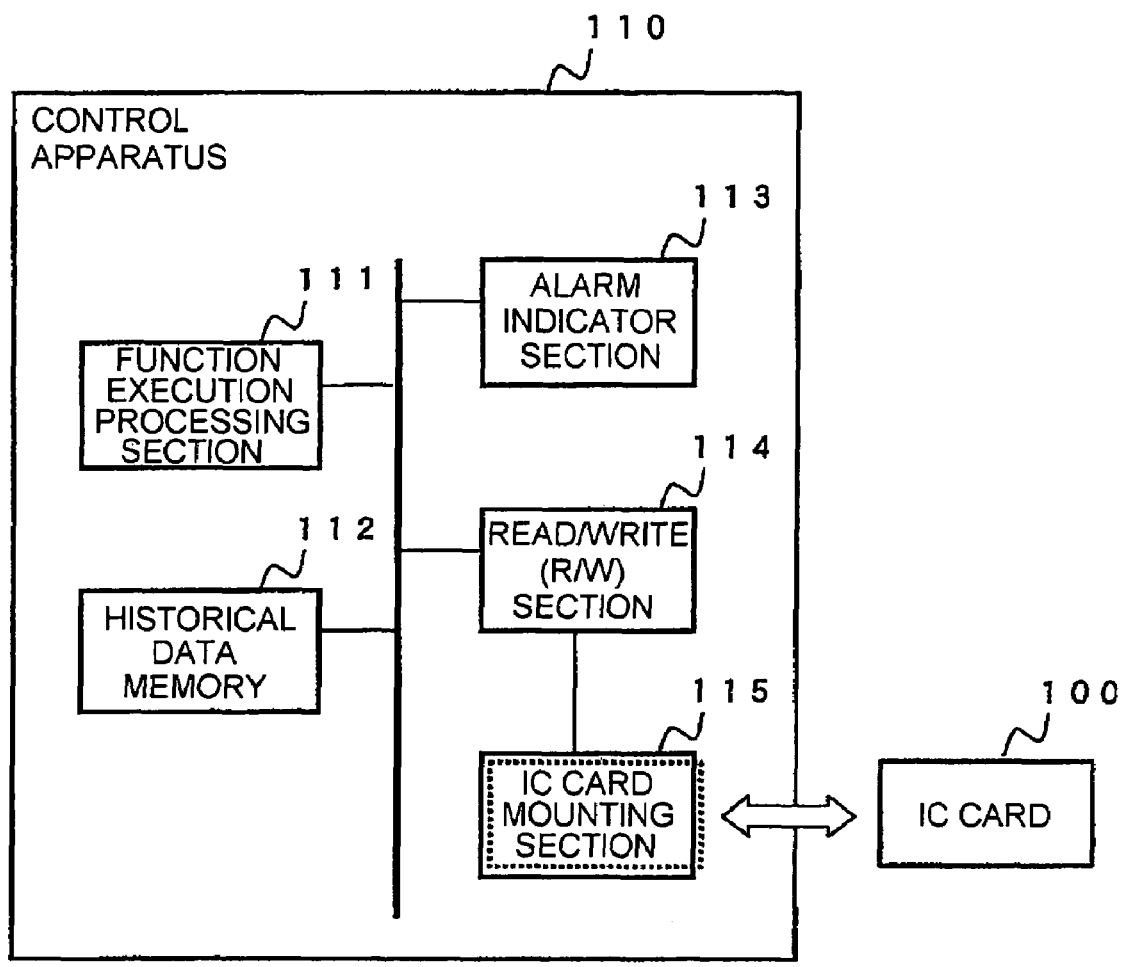
FIG. 1 is a functional block diagram of an existing system for acquiring maintenance information such as historical data.
Figure 2:
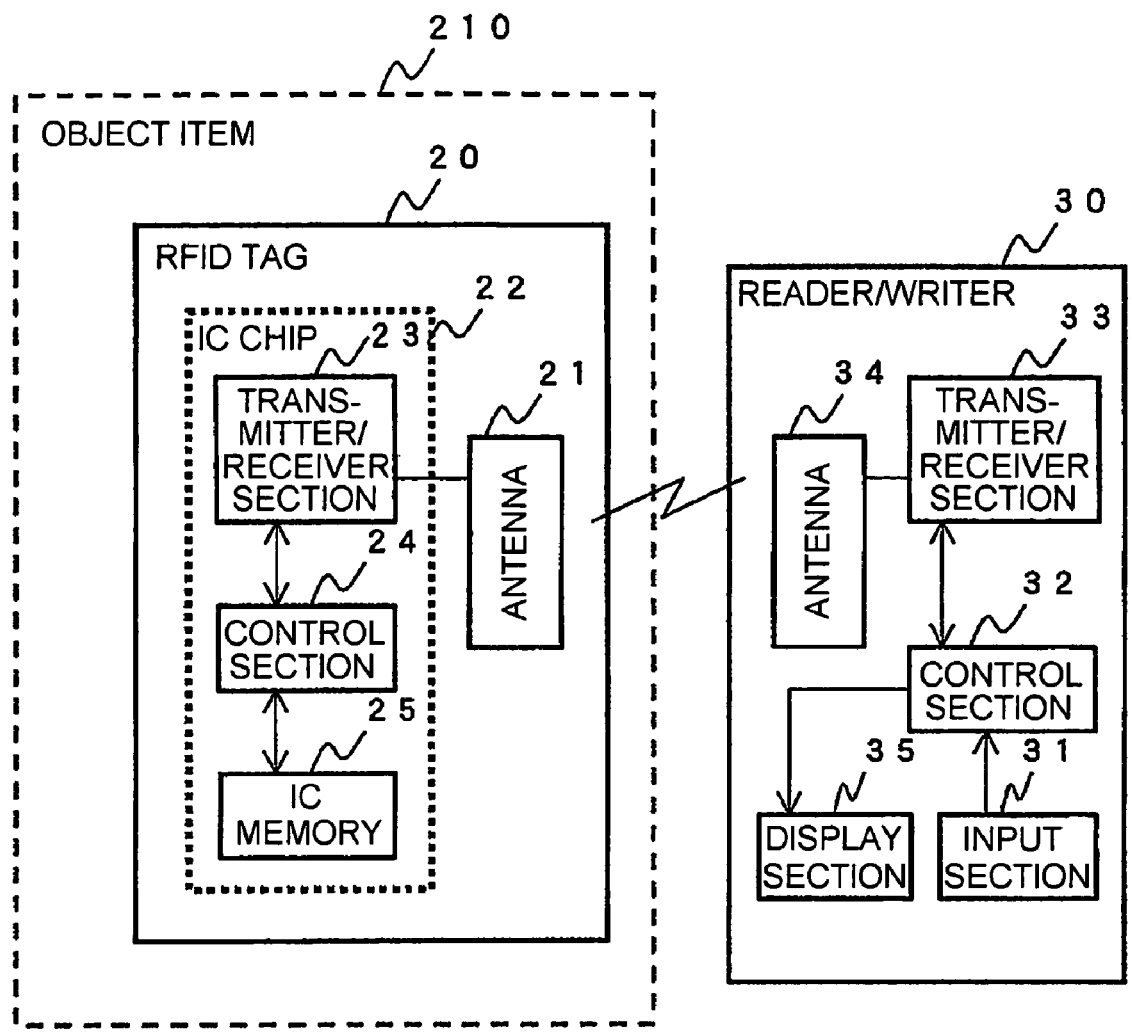
FIG. 2 is a functional block diagram of another existing system for acquiring maintenance information using an RFID tag.
Figure 3:
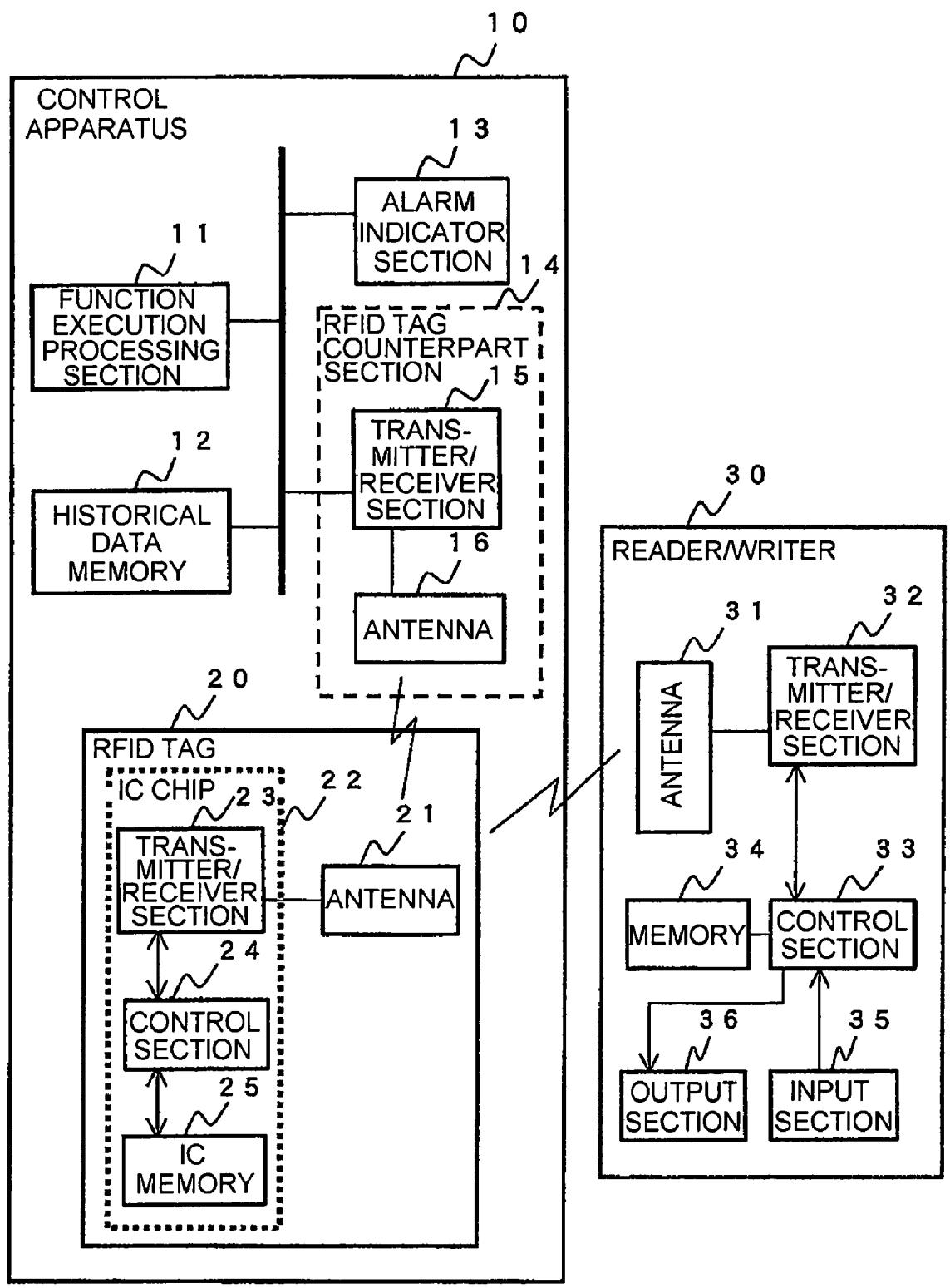
FIG. 3 is a functional block diagram of a system for acquiring maintenance information using an RFID tag according to a first embodiment of this invention.

Referring to FIG. 3, a system according to a first embodiment of this invention will be described.

As illustrated in FIG. 3, a control apparatus 10 as a maintenance object has an RFID (Radio Frequency Identification) tag 20 having read/write ability of allowing maintenance information of the control apparatus 10 to be written therein and read therefrom. The maintenance information stored in the RFID tag 20 can be read or written by a reader/writer 30.

In addition to the RFID tag 20, the control apparatus 10 comprises a function execution processing section 11, a historical data memory 12, an alarm indicator section 13, and an RFID tag counterpart section 14. The RFID tag counterpart section 14 includes a transmitter/receiver 15 and an antenna 16.

Figure 4:
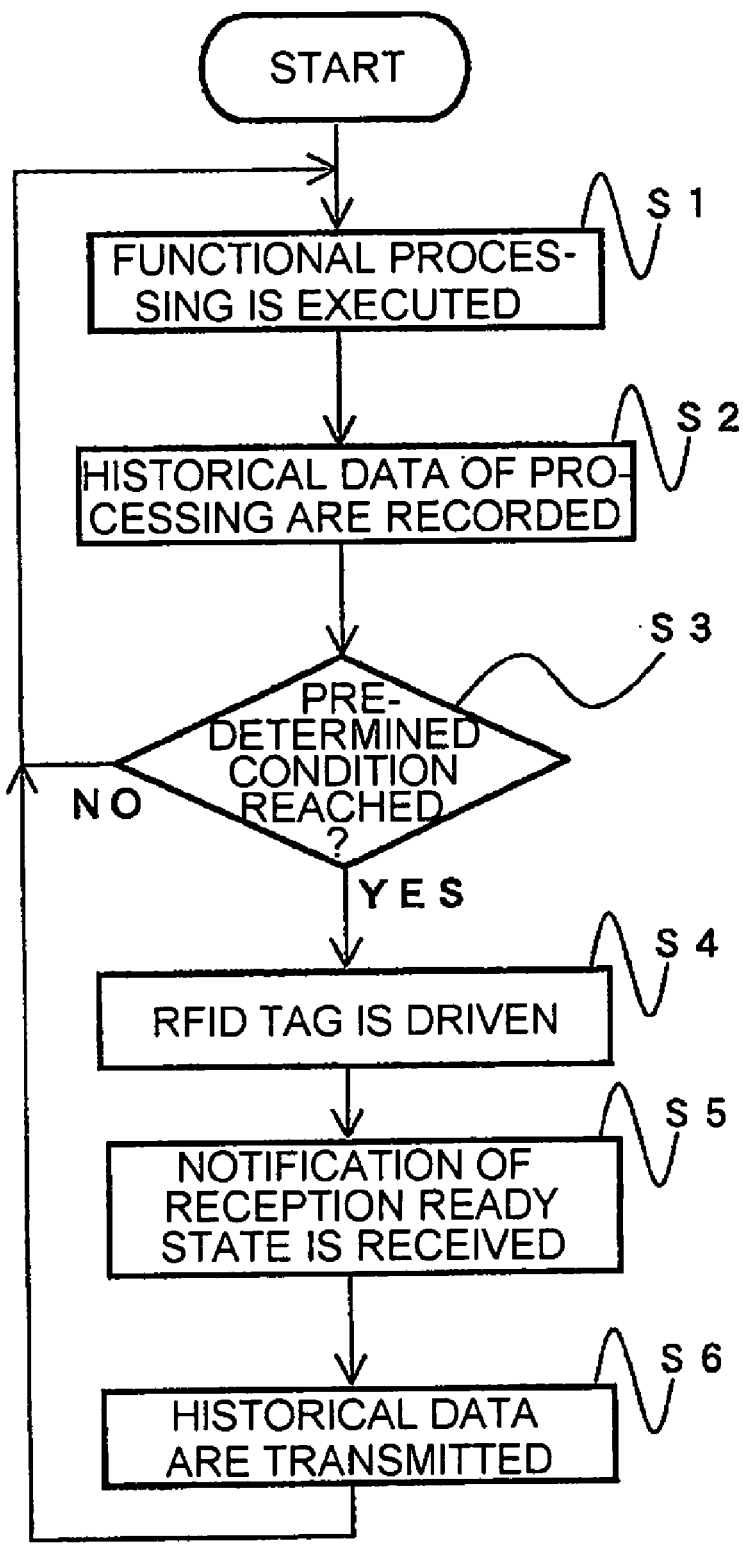
FIG. 4 is a flow chart for describing an operation of writing historical data on an apparatus side in the first embodiment.

Referring to FIG. 4, description will be made of an operation of the control apparatus 10 when the maintenance information is delivered to the RFID tag 20 to write the maintenance information in the RFID tag 20. In the control apparatus 10, the function execution processing section 11 executes a function (step S1). Upon executing the function, processing history (log) data are recorded in the historical data memory 12 (step S2).

If an end of a regular cycle, a predetermined time instant, or a predetermined condition is not reached (NO in step S3), the operation returns to the step S1 to execute next functional processing.

If "YES" in the step S3, i.e., if the end of the regular cycle, the predetermined time instant, or the predetermined condition is reached, the transmitter/receiver section 15 of the RFID tag counterpart section 14 drives the RFID tag 20 via the antenna 16 (step S4) and receives notification of a reception ready state (step S5). Thereafter, the transmitter/receiver section 15 transmits the maintenance information stored in the historical data memory 12 to the RFID tag 20 by a radio wave (step S6) to write the maintenance information into the RFID tag 20. Then, the operation returns to the step S1 to repeat the steps subsequent thereto.

If the predetermined condition is execution of each functional processing, the above-mentioned step S3 may be omitted and uninterrupted writing into the RFID tag 20 is executed for each functional processing.

The RFID tag 20 has an antenna 21 and an IC chip 22. The IC chip 22 includes a transmitter/receiver section 23, a control section 24, and an IC memory 25. When the antenna 21 receives a radio wave from the antenna 16 of the control apparatus 10, the RFID tag 20 produces induced power to drive the IC chip 22. The transmitter/receiver section 23 receives a write request carried by the radio wave from the transmitter/receiver section 15 of the RFID tag counterpart section 14. Under control of the control section 24, the transmitter/receiver section 23 writes the maintenance information received through the antenna 16 and the antenna 21 into the IC memory 25. On the other hand, when the antenna 21 receives a radio wave from the reader/writer 30, the RFID tag 20 produces induced power to drive the IC chip 22. In response to a read request carried by the radio wave from the reader/writer 30, the transmitter/receiver section 23 delivers the maintenance information stored in the IC memory 25 through the antenna 21 to the reader/writer 30 under control of the control section 24.

The transmitter/receiver section 23 is responsive to the write or the read request supplied through the antenna 21 and carries out a write or a read operation. Thus, the transmitter/receiver section 23 can respond to each of the write request and the read request from either of the transmitter/receiver section 15 of the RFID tag counterpart section 14 and the reader/writer 30.

As the reader/writer 30, use may be made of a general-purpose portable reader/writer as far as the radio wave can be transmitted and received to and from the RFID tag 20. Like in the known technique, the reader/writer 30 can write historical information into the RFID tag 20 from the outside of the control apparatus 10 as the maintenance object. Further, the reader/writer 30 illustrated in FIG. 3 can intercept, by an antenna 31, a transmitter/receiver 32 and a control section 33, the radio wave sent from the antenna 16 to the antenna 21 and write the radio wave into a memory 34.

Figure 5:
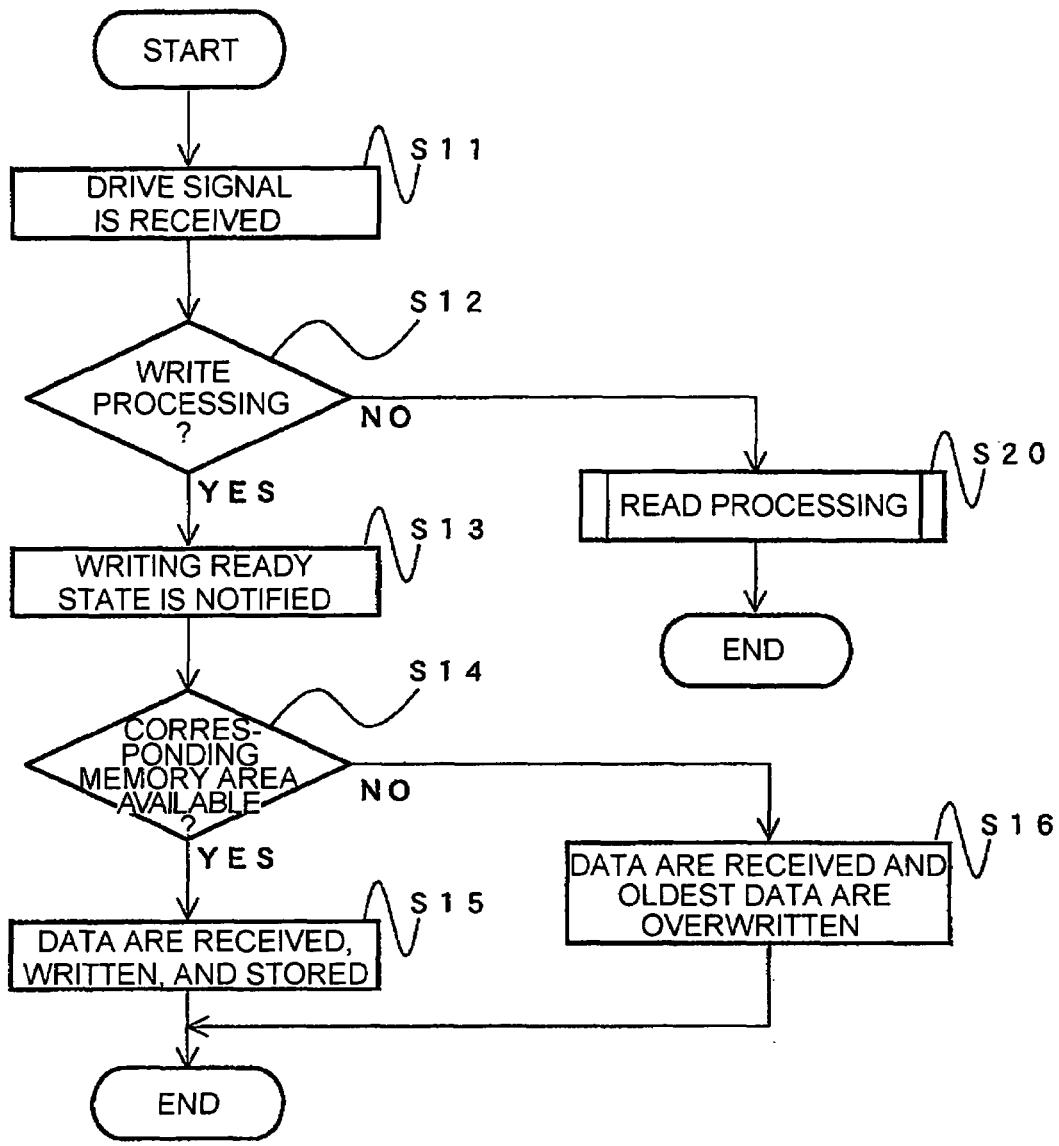
FIG. 5 is a flow chart for describing a main operation in the RFID tag in the first embodiment.

Next referring to FIG. 5, description will be made of a main operation of the RFID tag 20.

In the RFID tag 20, the transmitter/receiver section 23 receives a drive signal through the antenna 21 (step S11). In this event, the transmitter/receiver section 23 produces induced power in response to the radio wave carrying the drive signal to drive the control section 24. The control section 24 receives a processing request through the transmitter/receiver section 23 from the RFID tag counterpart section 14 or the reader/writer 30 (step S12). A write processing request from the RFID tag counterpart section 14 is a request for writing historical data of execution of function. A read processing request from the reader/writer 30 is a request for reading the above-mentioned maintenance information. A write processing request from the reader/writer 30 is a request for writing, for example, apparatus-specific information which is written into the control apparatus 10 at a production stage.

If "YES" in the step S12, i.e., if the write processing request is received through the transmitter/receiver section 23, the control section 24 completes preparation for writing into the IC memory 25 and notifies a writing ready state (step S13). As a consequence, the control section 24 receives as write data the maintenance information or the apparatus-specific information. If a corresponding memory area is available (YES in a step S14), the data received as the write data are written and stored (step S15). On the other hand, if "NO" in the step S14, i.e., if the memory area is unavailable, the data received as the write data are stored by overwriting oldest stored data (step S16).

If "NO" in the step S12, i.e., if the processing request is not the write processing request, predetermined read processing is executed (step S20). The read processing is an ordinary read procedure from the IC memory in the RFID tag like in the known technique and detailed description thereof will be omitted herein.

As described above, the historical data of the control apparatus can be stored in the RFID tag as the maintenance information. The RFID tag is small in size and light in weight and can be built in or fixedly attached to the housing of the control apparatus. Therefore, it is possible to avoid loss of the maintenance information stored in the RFID tag, to prevent occurrence of trouble due to penetration of a fluid such as dust or wastewater into the housing, and to read the maintenance information stored in the RFID tag by the reader via the radio wave. Accordingly, this invention is applicable to various control apparatuses for obtaining historical data, such as a human organ assist apparatus embedded into a human body, a human body information collect apparatus, or a diving instrument.

With the above-mentioned structure, the maintenance information is stored in the IC memory of the RFID tag. Therefore, even if the control apparatus fails and can not be turned on, the maintenance information stored in the RFID tag can be read from the RFID tag without disassembling the control apparatus.

Further, the historical data of the control apparatus are written into the RFID tag not via a lead wire but by the radio wave via the antenna. Therefore, even if the control apparatus connected to a commercial power supply is damaged by lightning, the RFID tag is not damaged and the data stored in the RFID tag can be secured.

Second Embodiment

Figure 6:
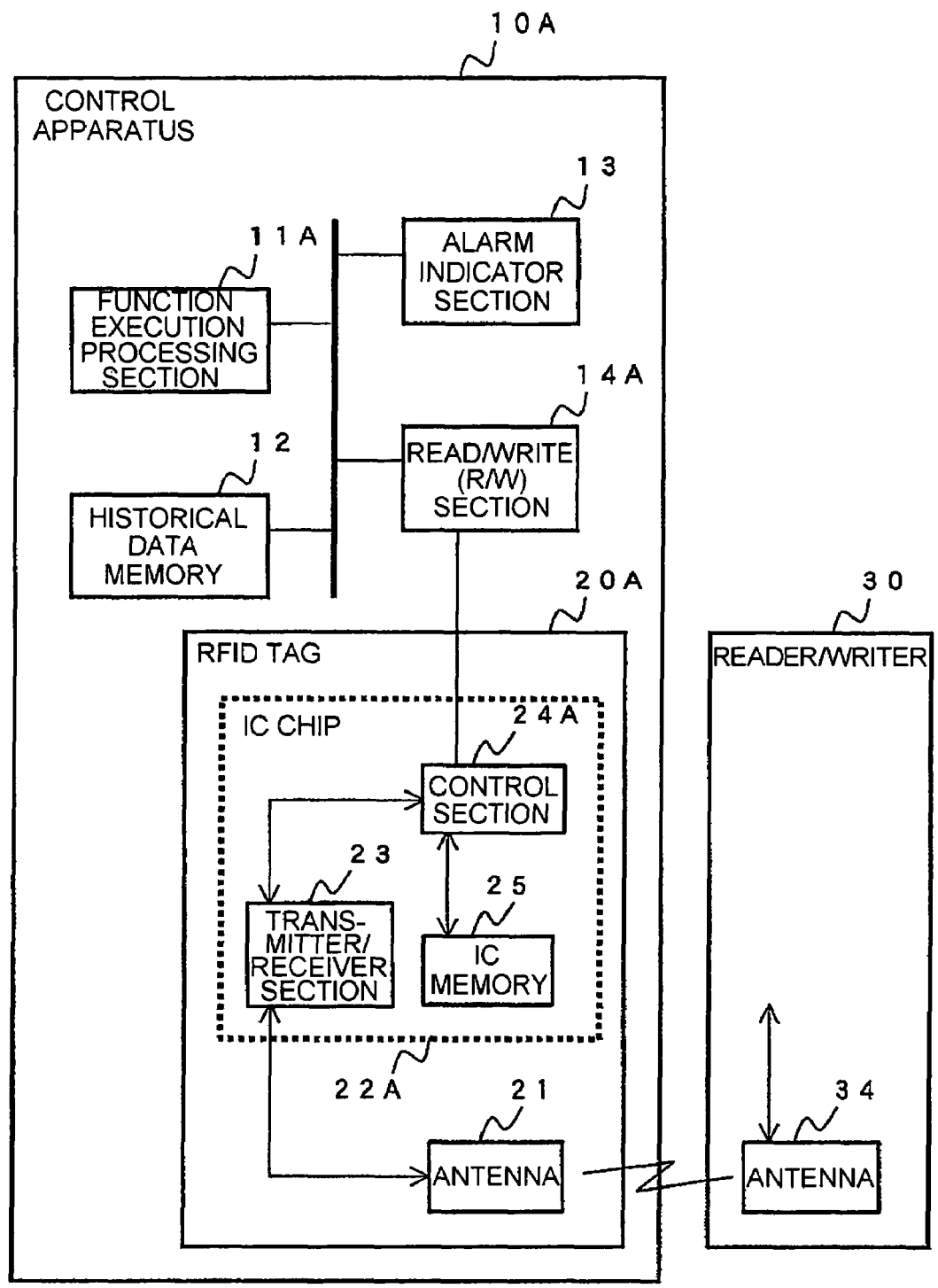
FIG. 6 is a functional block diagram of a system for acquiring maintenance information using an RFID tag according to a second embodiment of this invention.

Referring to FIG. 6, description will be made of a second embodiment of this invention.

In the second embodiment illustrated in FIG. 4, the RFID tag counterpart section 14 in FIG. 3 is replaced by a reader/writer (hereinafter abbreviated to RAN) section 14A electrically connected via a lead wire to a control section 24A of an RFID tag 20A.

The RFID tag 20A is directly connected to the R/W section 14A via the lead wire. Therefore, the step S3 in FIG. 4 is omitted. In the maintenance information write processing in FIG. 5, the steps S11 and S12 are omitted. Therefore, in this embodiment, the step S4 in FIG. 4 is followed by the step S13 in FIG. 5. According to execution of each functional processing, the maintenance information is uninterruptedly written.

As described above, the second embodiment has similar effects as those of the first embodiment except that a damage due to lightning can not be avoided.

Third Embodiment

Figure 7A:
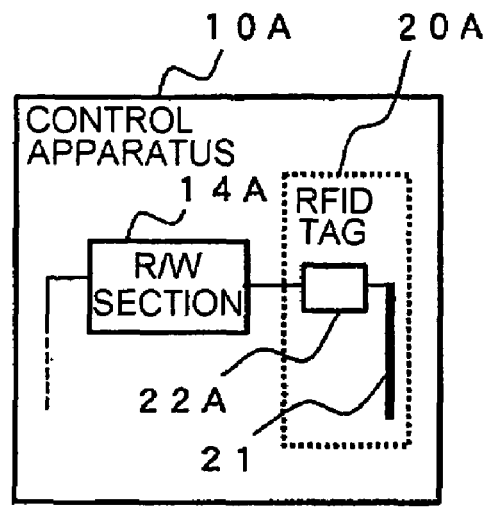
FIGS. 7A, 7B, and 7C show various arrangements of the RFID tag in FIG. 6 with respect to a housing of a control apparatus as third through fifth embodiments, respectively.

Referring to FIG. 7A, a third embodiment of this invention will be described.

In the third embodiment, the R/W section 14A and the RFID tag 20A connected via the lead wire to the R/W section 14A in the functional block diagram in FIG. 6 (second embodiment) are mounted inside the housing of the control apparatus OA. Therefore, the third embodiment has similar effects as those of the second embodiment.

In the third embodiment, however, if the housing has a metallic structure, it is impossible for the reader/writer 30 to read or write data into the RFID tag 20A.

Fourth Embodiment

Figure 7B:
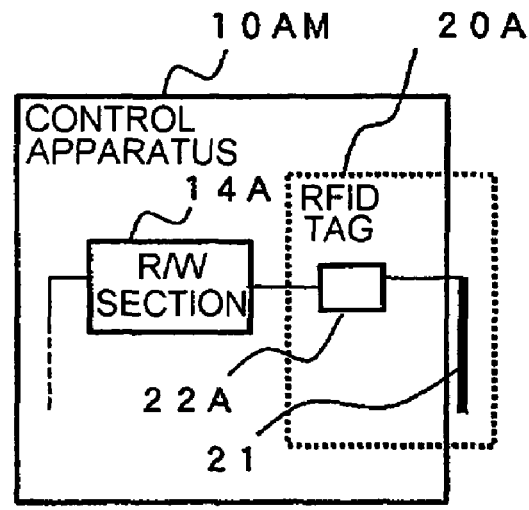

Referring to FIG. 7B, a fourth embodiment of this invention will be described. The fourth embodiment is adapted to the case where the housing has a metallic structure to meet the VCCI standard.

In the fourth embodiment, the R/W section 14A and the IC chip 22A of the RFID tag 20A in the functional block diagram in FIG. 6 (second embodiment) are mounted inside a housing of a control apparatus 10AM while the antenna 21 is attached to the outside of the housing and connected to the inside of the housing in a closed state via a lead wire insulated from the housing. The R/W section 14A accesses to the IC chip 22A of the RFID tag 20A only under a predetermined condition and requires only a small power. Therefore, the VCCI standard is met. Thus, the fourth embodiment has similar effects as those of the second embodiment. The antenna 21 of the RFID tag 20A has a thin profile and does not protrude from an outer surface of the housing. For example, the antenna 21 can be painted from an upper side together with the outer surface of the housing.

Fifth Embodiment

Figure 7C:
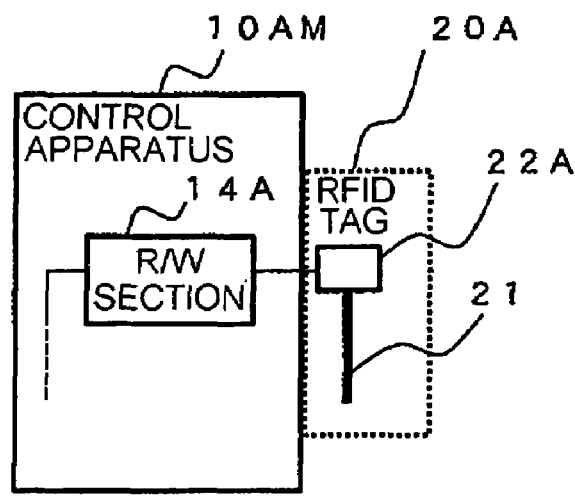

Referring to FIG. 7C, a fifth embodiment of this invention will be described. The fifth embodiment is adapted to the case where the housing has a metallic structure to meet the VCCI standard.

In the fifth embodiment, a whole of the thin-profile and light-weight RFID tag 20A in the functional block diagram of FIG. 6 (second embodiment) is attached to the outside of the housing and connected to the inside of the housing in a closed state via a lead wire insulated from the housing. The R/W section 14A accesses to the IC chip 22A of the RFID tag 20A only under a predetermined condition and requires only a small power. Therefore, the VCCI standard is met. Thus, the fifth embodiment has similar effects as those of the second embodiment. The RFID tag 20A has a thin profile and does not protrude from an outer surface of the housing, like in the fourth embodiment. For example, the antenna 21 can be painted from an upper side together with the outer surface of the housing.

Sixth Embodiment

Figure 8A:
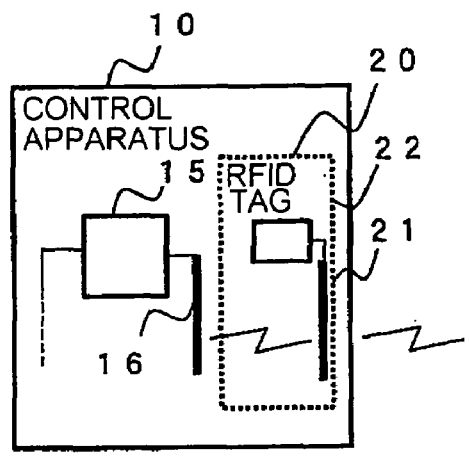
FIGS. 8A, 8B, 8C, and 8D show various arrangements of the RFID tag in FIG. 3 with respect to a housing of a control apparatus as sixth through ninth embodiments, respectively.

Referring to FIG. 8A, a sixth embodiment of this invention will be described.

In the sixth embodiment, the RFID tag 20 in the functional block diagram of FIG. 3 (first embodiment) is mounted inside the housing of the control apparatus 10. Therefore, the sixth embodiment has similar effects to those of the first embodiment.

In the sixth embodiment, however, if the housing has a metallic structure, it is impossible for the reader/writer 30 to read or write data into the RFID tag 20.

Seventh Embodiment

Figure 8B:
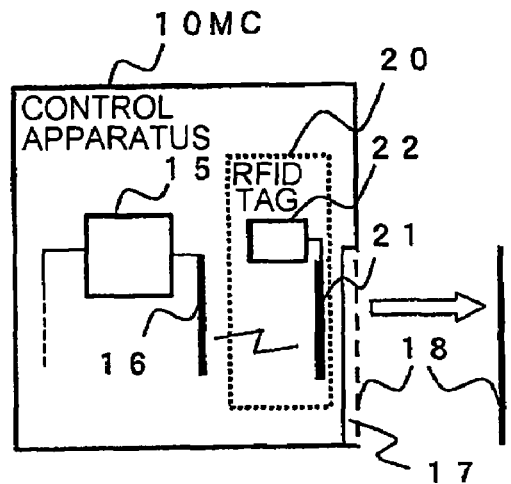

Referring to FIG. 8B, a seventh embodiment of this invention will be described. The seventh embodiment is adapted to the case where the housing has a metallic structure to meet the VCCI standard.

As illustrated in the figure, a housing of the control apparatus 10MC has a metallic structure. The housing is provided with a window 17 formed at a portion corresponding to the antenna 21 of the RFID tag 20 to transmit the radio wave. For example, the window 17 has a mold structure. In conformity with the window 17, a removable metal cover 18 is provided to close the window 17 except when the reader reads the maintenance information from the RFID tag 20. Therefore, the seventh embodiment exhibits similar effects to those of the first embodiment.

Eighth Embodiment

Figure 8C:
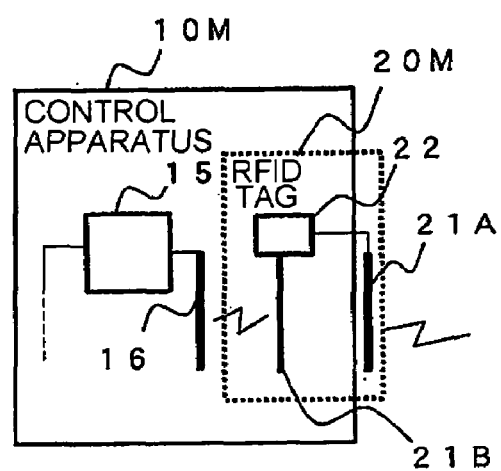

Referring to FIG. 8C, an eighth embodiment of this invention will be described. The eighth embodiment is adapted to the case where the housing has a metallic structure to meet the VCCI standard.

As illustrated in the figure, an RFID tag 20M has two antennas 21A and 21B. The antenna 21A is attached to the outside of a metallic housing of a control apparatus 10M and connected to the inside of the housing in a closed state via a lead wire insulated from the housing. The other antenna 21B is disposed inside the metallic housing and transmits and receives the radio wave to and from the antenna 16 of the control apparatus. Therefore, the eighth embodiment exhibits similar effects to those of the first embodiment. The antenna 21A of the RFID tag 20M has a thin profile and does not protrude from an outer surface of the housing. For example, the antenna 21A can be painted from an upper side together with the outer surface of the housing.

Ninth Embodiment

Figure 8D:
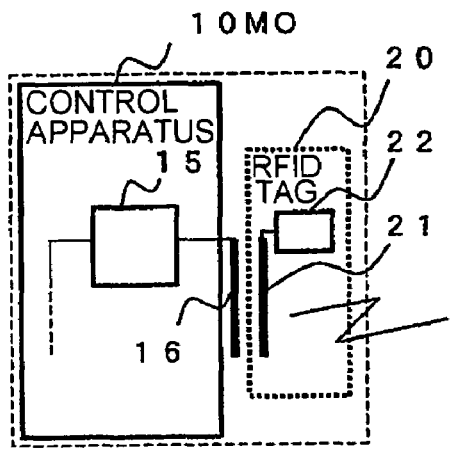

Referring to FIG. 8D, a ninth embodiment of this invention will be described. The ninth embodiment is adapted to the case where the housing has a metallic structure to meet the VCCI standard.

In the ninth embodiment, a whole of the thin-profile and light-weight RFID tag 20 in the functional block diagram of FIG. 3 (first embodiment) is attached to the outside of the housing. Further, the antenna 16 of a control apparatus 10MO is also attached to the outside of the housing and connected to the inside of the housing in a closed state via a lead wire insulated from the housing. The antenna 21 of the RFID tag 20 and the antenna 16 are electrically insulated from each other and can transmit and receive the radio wave to and from each other. Thus, the ninth embodiment has similar effects to those of the first embodiment. Each of the RFID tag 20 and the antenna 16 has a thin profile and does not protrude from an outer surface of the housing, like in the fifth embodiment. For example, each of the RFID tag 20 and the antenna 16 can be painted from an upper side together with the outer surface of the housing.

Tenth Embodiment

Figure 9:
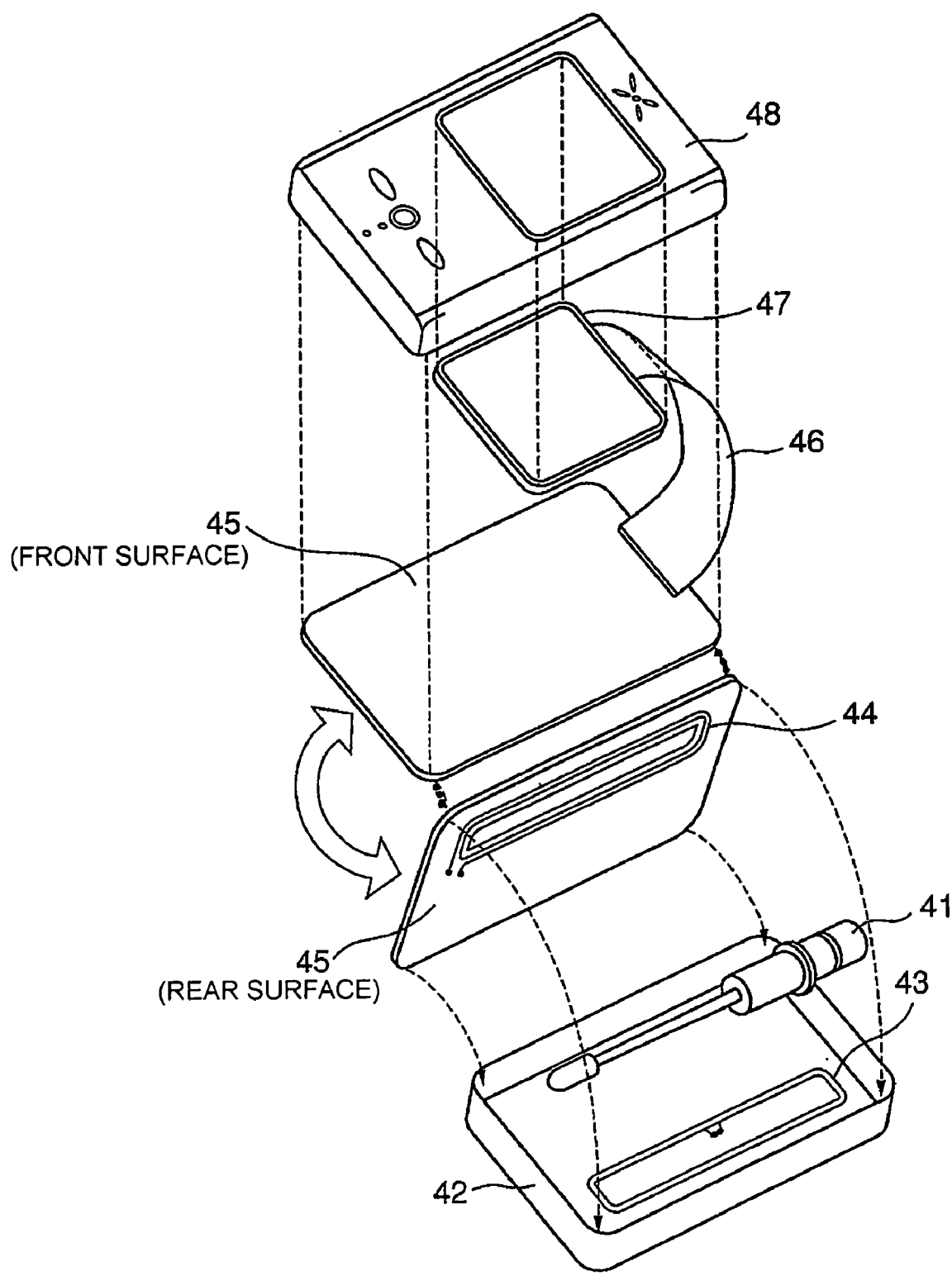
FIG. 9 is an exploded perspective view of a mobile terminal according to a tenth embodiment.

Referring to FIG. 9, a tenth embodiment of this invention will be described. In the tenth embodiment, the sixth embodiment illustrated in FIG. 8A is applied to a mobile terminal.

In the tenth embodiment, a communication antenna 41 is supported by a mold housing 42 with an RFID tag 43 attached thereto. Inside the mold housing 42, a printed board 45 is received. On the printed board 45, an RFID tag writing antenna 44 of the mobile terminal is printed. As a consequence, an antenna of the RFID tag 43 and the RFID tag writing antenna 44 are faced to each other. The printed board 45 is connected via a flat print cable 46 to an LCD (Liquid Crystal Display) panel 47. The LCD panel 47 is fitted to a rear side of a front mold housing 48 so that a front surface of the LCD panel 47 is seen and fixed to a surface of the mold hosing 42 on the rear side.

As described above, the RFID tag for transmitting and receiving data via the radio wave is used to acquire the maintenance information. Therefore, this invention is applicable to the case where not only the maintenance information containing real processing historical data in the control apparatus contained in the closed housing but also the maintenance information such as repair data are easily written and stored from the outside of the maintenance object and easily read as in the known technique. Further, in case where the electric circuit of the control apparatus is provided with the antenna for transmitting and receiving data by the radio wave to and from the RFID tag electrically insulated therefrom, this invention is generally applicable to those apparatuses possibly damaged by lightning, such as a large-scale electric apparatus connected to a commercial power supply or a small-sized mobile terminal apparatus having a communication antenna. Further, by the use of the RFID tag operated only upon reception of the radio wave for driving the RFID tag, this invention is applicable to the case where the VCCI standard essentially requiring the housing of a radio wave shielding structure must be met.

While this invention has thus far been described in connection with the preferred embodiments thereof, it will be readily possible for those skilled in the art to put this invention into practice in various other manners without departing from the scope set forth in the appended claims.

What is claimed is:

1. A system for acquiring maintenance information, comprising a control apparatus and a reader,
    said control apparatus comprising: an RFID tag including a first antenna and an IC memory and allowing data to be written in and read from the IC memory through the first antenna; a second antenna; and a historical data memory for storing the maintenance information;
    said reader comprising a third antenna and sending a read request via the third antenna by using the radio wave to acquire the maintenance information from the first antenna,
    wherein a housing of said control apparatus has a radio wave shielding structure, the housing of the radio wave shielding structure having a removable radio wave shielding cover allowing transmission/reception of the radio wave at least at a portion corresponding to the first antenna.

2. A system for acquiring maintenance information, comprising a control apparatus and a reader,
    said control apparatus comprising: an RFID tag including a first antenna and an IC memory and allowing data to be written in and read from the IC memory through the first antenna; a second antenna; and a historical data memory for storing the maintenance information;
    said reader comprising a third antenna and sending a read request via the third antenna by using the radio wave to acquire the maintenance information from the first antenna,
    wherein a housing of said control apparatus has a radio wave shielding structure, the first antenna of the RFID tag being disposed on an outer surface of the housing of the radio wave shielding structure for transmitting and receiving data to and from the third antenna, the RFID tag further having a fourth antenna disposed inside the housing of the radio wave shielding structure for transmitting and receiving data to and from the second antenna.

3. A system for acquiring maintenance information, comprising a control apparatus and a reader,
    said control apparatus comprising: an RFID tag including a first antenna and an IC memory and allowing data to be written in and read from the IC memory through the first antenna; a second antenna; and a historical data memory for storing the maintenance information;
    said reader comprising a third antenna and sending a read request via the third antenna by using the radio wave to acquire the maintenance information from the first antenna,
    wherein a housing of said control apparatus has a radio wave shielding structure, the second antenna and the RFID tag of the control apparatus being disposed on an outer surface of the housing.

* * * * *